(12) United States Patent
Bai

(10) Patent No.: US 12,463,297 B2
(45) Date of Patent: Nov. 4, 2025

(54) SECONDARY BATTERY, BATTERY MODULE, AND DEVICE USING BATTERY AS POWER SUPPLY

(71) Applicant: CONTEMPORARY AMPEREX TECHNOLOGY (HONG KONG) LIMITED, Hong Kong (CN)

(72) Inventor: Lulu Bai, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 707 days.

(21) Appl. No.: 17/702,908

(22) Filed: Mar. 24, 2022

(65) Prior Publication Data

US 2022/0216574 A1    Jul. 7, 2022

Related U.S. Application Data

(63) Continuation of application No. PCT/CN2020/139185, filed on Dec. 24, 2020.

(30) Foreign Application Priority Data

Jan. 17, 2020   (CN) .......................... 202010054531.4

(51) Int. Cl.
*H01M 50/533* (2021.01)
*H01M 50/147* (2021.01)
(Continued)

(52) U.S. Cl.
CPC ....... *H01M 50/533* (2021.01); *H01M 50/147* (2021.01); *H01M 50/172* (2021.01);
(Continued)

(58) Field of Classification Search
CPC ......... H01M 501/533; H01M 501/147; H01M 501/172; H01M 501/209; H01M 501/528;
(Continued)

(56) References Cited

U.S. PATENT DOCUMENTS

2006/0073382 A1* 4/2006 Urano ................ H01M 50/147
429/174
2008/0289171 A1* 11/2008 Cheng ................ H01M 50/103
29/623.1

(Continued)

FOREIGN PATENT DOCUMENTS

| CN | 205248346 U | 5/2016 |
|---|---|---|
| CN | 205609629 U | 9/2016 |

(Continued)

OTHER PUBLICATIONS

Extended European Search Report of EP application No. 20913277.8, dated Dec. 22, 2022, 9 pages.

(Continued)

*Primary Examiner* — Adam J Francis
(74) *Attorney, Agent, or Firm* — Ladas & Parry LLP

(57) ABSTRACT

Embodiments of this application provide a secondary battery, a battery module, and a device using a battery as a power supply. A secondary battery includes: a cap plate; electrode terminals, disposed on the cap plate; an electrode assembly, including a main body and tabs extending from the main body, where each of the tabs includes a connection portion and a bend portion, the connection portion is electrically connected to one of the electrode terminals, and the bend portion is bent against the connection portion and is connected between the connection portion and the main body; and a first insulation member, disposed at a side that is of the connection portion and that is away from the cap plate.

12 Claims, 9 Drawing Sheets

(51) Int. Cl.
*H01M 50/172* (2021.01)
*H01M 50/209* (2021.01)
*H01M 50/528* (2021.01)

(52) U.S. Cl.
CPC ....... *H01M 50/209* (2021.01); *H01M 50/528* (2021.01); *H01M 2220/20* (2013.01)

(58) Field of Classification Search
CPC ........... H01M 501/15; H01M 501/534; H01M 501/536; H01M 501/593; H01M 501/538; H01M 2220/20; H01M 10/0587; H01M 10/0431; H01M 10/0525
See application file for complete search history.

(56) References Cited

U.S. PATENT DOCUMENTS

| | | | | |
|---|---|---|---|---|
| 2012/0244421 A1* | 9/2012 | Yamazaki | ........... | H01M 50/178 429/176 |
| 2016/0099444 A1* | 4/2016 | Park | .................... | H01M 50/566 429/82 |
| 2019/0221877 A1* | 7/2019 | Li | ....................... | H01M 50/533 |
| 2021/0066700 A1* | 3/2021 | Wang | ................. | H01M 50/529 |

FOREIGN PATENT DOCUMENTS

| | | | | | |
|---|---|---|---|---|---|
| CN | 206250261 | U | | 6/2017 | |
| CN | 206432317 | U | | 8/2017 | |
| CN | 107968182 | A | * | 4/2018 | ........ H01M 10/0431 |
| CN | 208189697 | U | * | 12/2018 | ............ H01M 10/38 |
| CN | 109698385 | A | | 4/2019 | |
| CN | 209561523 | U | | 10/2019 | |
| CN | 209766569 | U | | 12/2019 | |
| CN | 209786120 | U | | 12/2019 | |
| CN | 210467893 | U | | 5/2020 | |
| EP | 2858144 | A1 | | 4/2015 | |
| EP | 3331062 | A1 | | 6/2018 | |
| EP | 3511998 | A1 | | 7/2019 | |
| EP | 3770995 | A1 | | 1/2021 | |
| EP | 3989352 | B1 | | 8/2024 | |
| JP | H04147517 | A | | 5/1992 | |
| JP | H10154505 | A | | 6/1998 | |
| JP | 2014112492 | A | | 6/2014 | |
| JP | 2015106534 | A | | 6/2015 | |
| JP | 2019145271 | A | | 8/2019 | |
| KR | 20130014334 | A | | 2/2013 | |
| KR | 20130026971 | A | | 3/2013 | |
| KR | 101342696 | B1 | | 12/2013 | |
| KR | 20150039075 | A | | 4/2015 | |
| KR | 20160042243 | A | | 4/2016 | |
| WO | 2018021698 | A1 | | 2/2018 | |
| WO | 2019179232 | A | | 9/2019 | |

OTHER PUBLICATIONS

Notification to Grant Patent Right, CN Application No. 202010054531.4, Sep. 15, 2021.
First Office Action of Indian Application No. 202227029473, mailed Aug. 9, 2022, 5 pages.
First Office Action of EP application No. 20913277.8, dated Sep. 4, 2023.
First Office Action of KR application No. 10-2022-7016530, dated Aug. 1, 2024.
First Office Action of JP Application No. 2022-528650, Mailed Jun. 27, 2023.
ISR for International Application PCT/CN2020/139185 mailed Feb. 26, 2021.
Written Opinion for International Application PCT/CN2020/139185 mailed Feb. 26, 2021.
Chinese OA1 for counterpart application 202010054531.4 mailed Jul. 16, 2021.
Notice of Opposition for EP application No. 20913277.8, dated May 26, 2025.
Notice of allowance, KR application No. 10-2022-7016530, dated Aug. 6, 2025.

* cited by examiner

SECONDARY BATTERY, BATTERY MODULE, AND DEVICE USING BATTERY AS POWER SUPPLY

CROSS-REFERENCE TO RELATED APPLICATIONS

This application is a continuation of International Patent Application No. PCT/CN2020/139185 filed on Dec. 24, 2020, which claims priority to Chinese Patent Application No. 202010054531.4, filed on Jan. 17, 2020. The aforementioned patent applications are incorporated herein by reference in their entirety.

TECHNICAL FIELD

Embodiments of this application relate to the field of batteries, and in particular, to a secondary battery, a battery module, and a device using a battery as a power supply.

BACKGROUND

A secondary battery such as a lithium-ion battery is widely used in electronic devices such as a mobile phone and a notebook computer by virtue of a high energy density and environmental friendliness. In recent years, in order to cope with environmental issues, gasoline price issues, and energy storage issues, the application of lithium-ion batteries has been rapidly expanded to hybrid electric vehicles, ships, and energy storage systems.

Currently, a secondary battery mainly includes a housing and an electrode assembly disposed in the housing. The housing contains electrode terminals, and the electrode assembly contains tabs. The tabs are electrically connected to the electrode terminals. In order to increase an energy density of the secondary battery, the tabs need to be bent to occupy a smaller space.

SUMMARY

In view of the problems in the background technologies, an objective of this application is to provide a secondary battery, a battery module, and a device using a battery as a power supply to make tabs occupy a smaller space and reduce the risk of rupturing the tabs.

To achieve the foregoing objective, this application provides a secondary battery. The secondary battery includes: a cap plate; electrode terminals, disposed on the cap plate; an electrode assembly, including a main body and tabs extending from the main body, where each of the tabs includes a connection portion and a bend portion, the connection portion is electrically connected to one of the electrode terminals, and the bend portion is bent against the connection portion and is connected between the connection portion and the main body; and a first insulation member, disposed at a side that is of the connection portion and that is away from the cap plate. The first insulation member includes a first insulator connected to the connection portion, a second insulator connected to the main body, and a third insulator connected between the first insulator and the second insulator. At least a part of the bend portion is not fixed to the first insulation member.

In this application, a tab is bent into a connection portion and bend portion to make the tab occupy a smaller space. The first insulator can fix the connection portion, disperse a stress transmitted to the connection portion, and reduce the risk of rupturing the connection portion. The second insulator can avoid inserting the end that is of the connection portion and that is away from the bend portion into the main body, and reduce the short-circuit risk. At least a part of the bend portion is not fixed to the first insulation member. Therefore, the part that is of the bend portion and that is not fixed to the first insulation member can release the stress during the bending of the tab, thereby reducing the risk of fracturing the bend portion.

In a secondary battery according to some embodiments, the third insulator includes a first part and a second part. The first part is connected between the first insulator and the second part. The first part is fixed to the bend portion, and the second part covers a part of the bend portion and is not fixed to the bend portion.

The third insulator connects the first insulator and the second insulator together to improve the connection strength between the first insulator and the second insulator on the electrode assembly, and reduce the peel-off risk.

In a secondary battery according to some embodiments, the third insulator includes an inner piece and an outer piece fixed to the inner piece. The inner piece is disposed between the outer piece and the bend portion, and the inner piece is not fixed to the bend portion.

Both the inner piece and the outer piece are single-sided adhesive tape. The inner piece and the outer piece are directly bonded together. A surface that is of the inner piece and that is away from the outer piece is smooth and non-adhesive, so that the inner piece is not fixed to the bend portion.

In a secondary battery according to some embodiments, the first insulator is bonded to the connection portion. The outer piece is bonded to the inner piece. The second insulator is bonded to the main body.

Both the first insulator and the second insulator are single-sided adhesive tape. The first insulator, the outer piece, and the second insulator are different parts of one piece of single-sided adhesive tape. The inner piece is another piece of single-sided adhesive tape of a smaller size. In this application, two pieces of single-sided adhesive tape of different sizes are bonded together to form a first insulation member that is adhesive in a specific region.

In a secondary battery according to some embodiments, along a direction in which the bend portion points to the third insulator, the second insulator extends beyond the connection portion.

Along a direction in which the bend portion points to the third insulator, the second insulator extends beyond the connection portion. In this case, the second insulator can separate the connection portion from the main body, so that the end that is of the connection portion and that is away from the bend portion is prevented from being inserted into the main body, and the short-circuit risk is reduced.

In a secondary battery according to some embodiments, the first insulation member further includes a fourth insulator. The fourth insulator is connected to an end of the second insulator, the end being away from the third insulator. In the thickness direction of the main body, the fourth insulator is connected to the outside of the main body.

The fourth insulator disposed can increase the connection strength between the entire first insulation member and the electrode assembly, and reduce the risk of peeling off the first insulation member from the electrode assembly under the immersion of the electrolytic solution.

In a secondary battery according to some embodiments, the secondary battery further includes current collection members. Each of the current collection members is configured to connect the electrode terminal and the tab. The current collection member is welded to the connection portion to form a weld region. The first insulator covers the weld region from a side of the weld region, the side being oriented toward the main body.

In this application, the first insulator covers the weld region from a side of the weld region, the side being oriented toward the main body. The region of the current collection member, to which the connection portion is welded, can be connected with an unwelded region by the first insulator, so as to reduce the risk of fracturing the connection portion in a process of bending the tab.

In a secondary battery according to some embodiments, the secondary battery further includes a second insulation member, and the second insulation member covers the weld region from a side of the weld region, the side being oriented toward the cap plate.

The second insulation member is bonded to a surface that is of the weld region and that is oriented toward the cap plate, so as to fix the metal particles on the surface of the weld region.

In a secondary battery according to some embodiments, the second insulation member includes a first overlayer and a second overlayer. The first overlayer covers the weld region from a side of the weld region, the side being oriented toward the cap plate. The second overlayer is connected to the first overlayer and is bent against the first overlayer. The second overlayer is located at a side that is of the bend portion and that is away from the third insulator, and is connected to the bend portion.

With the second overlayer disposed, the bend portion can be separated from the housing, thereby preventing the bend portion from being scratched by the housing, and ensuring the current-carrying capacity of the bend portion.

In a secondary battery according to some embodiments, the second insulation member further includes a third overlayer. The third overlayer extends from an end that is of the second overlayer and that is away from the first overlayer. The third overlayer is connected to the main body.

The third overlayer disposed can increase the connection strength between the entire second insulation member and the electrode assembly, and reduce the risk of peeling off the second insulation member from the electrode assembly under the immersion of the electrolytic solution. In some embodiments, the third overlayer can further reduce the risks such as scratch of the main body by the housing.

In a secondary battery according to some embodiments, the secondary battery further includes a prop member. The prop member includes a first prop board, a second prop board, and a third prop board. The first prop board is disposed at a side of the first insulator away from the cap plate. The second prop board is located between the first prop board and the second insulator. The third prop board is connected between the first prop board and the second prop board. Along a direction in which the bend portion points to the third insulator, the second insulator extends beyond the second prop board.

The prop member is formed by bending a sheet material. Under the action of an inherent elastic force, the first prop board can prop the connection portion from a lower side. In this way, the end that is of the connection portion and that is away from the bend portion is prevented from being bent downward and inserted into the main body. When the tab is bent, the third prop board can support shaping of the bend portion of the tab, thereby reducing the risk of inserting the bend portion into the main body.

This application further provides a battery module. The battery module includes the secondary battery described above. The secondary battery is plural in number.

This application further provides a device using a battery as a power supply. The battery is the secondary battery described above.

In the secondary battery, the battery module, and the device using a battery as a power supply described above, the tab is bent into a connection portion and a bend portion to make the tab occupy a smaller space. The first insulator can fix the connection portion, disperse a stress transmitted to the connection portion, and reduce the risk of rupturing the connection portion. The second insulator can separate the connection portion from the main body, so that the end that is of the connection portion and that is away from the bend portion is prevented from being inserted into the main body, and the short-circuit risk is reduced. At least a part of the bend portion is not fixed to the first insulation member. Therefore, the part that is of the bend portion and that is not fixed to the first insulation member can release the stress during the bending of the tab, thereby reducing a tensile force exerted by the first insulation member on the bend portion and reducing the risk of fracturing the bend portion.

BRIEF DESCRIPTION OF DRAWINGS

To describe the technical solutions in the embodiments of this application more clearly, the following outlines the drawings used in the embodiments of this application. Evidently, the drawings outlined below are merely a part of embodiments of this application.

A person of ordinary skill in the art may derive other drawings from the outlined drawings without making any creative efforts.

Figure 1:
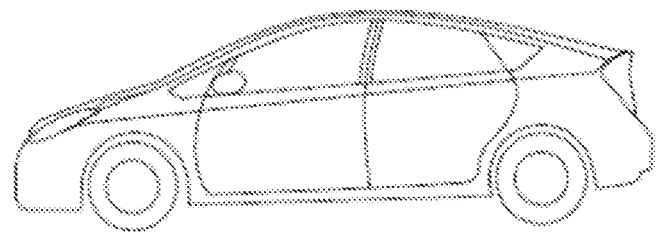
FIG. 1 is a schematic diagram of a device using a battery as a power supply according to some embodiments of this application.

The drawings are not drawn to scale.

REFERENCE NUMERALS

1: Cap plate;
11. Injection hole;
2. Electrode assembly;
21. Main body;
211. First surface
212. Second surface
213. Third surface;
22: Tab;
221. Connection portion;
222. Bend portion;
23. First electrode plate;
24. Second electrode plate;
25. Separator;
3. First insulation member;
31. First insulator;
32. Second insulator;
33. Third insulator;
331. First part;
332. Second part;
333. Inner piece;
334. Outer piece;
34. Fourth insulator;
4. Electrode terminal;
5. Current collection member;
51. First current collection portion;
52. Second current collection portion;
6. Second insulation member;
61. First overlayer;
62. Second overlayer;
63. Third overlayer;
7. Prop member;
71. First prop board;
72. Second prop board;
73. Third prop board;
8. Housing;
9. Rupture disk;
1000. Secondary battery;
W. Weld region;
X. Length direction;
Y Thickness direction; and
Z. Height direction.

DETAILED DESCRIPTION

To make the objectives, technical solutions, and advantages of this application clearer, the following describes this application in further detail with reference to accompanying drawings and embodiments. Understandably, the specific embodiments described herein are merely intended to explain this application, but are not intended to limit this application.

In the context of this application, unless otherwise expressly specified, the terms such as "first", "second", "third", and "fourth" are for the sole purpose of description rather than indicating or implying any order of preference; the term "a plurality of" means two or more (including two); unless otherwise expressly specified, the term "connect" needs to be understood in a broad sense. For example, a "connection" may be a fixed connection, or a detachable connection, or an integrated connection, or an electrical connection or signal connection; or may be a direct connection or an indirect connection implemented through an intermediate medium. A person of ordinary skill in the art understands the specific meanings of the terms in this application according to the context.

Understandably, in the context of this application, directional terms such as "on", "above", "under", and "below" described in the embodiments of this application are described from a perspective shown in the drawings, and are not to be understood as a limitation on the embodiments of this application. The following describes this application in further detail with reference to specific embodiments and accompanying drawings.

The directional terms appearing in the following description indicate the directions shown in the drawings, but are not intended to limit specific structures in this application. In the context of this application, unless otherwise expressly specified, the terms "mount", "concatenate", and "connect" are understood in a broad sense. For example, a "connection" may be a fixed connection, a detachable connection, or an integrated connection, and may be a direct connection or an indirect connection implemented through an intermediary. A person of ordinary skill in the art can understand the specific meanings of the terms in this application according to specific situations.

Embodiments of this application provide a device using a battery as a power supply. The battery is a secondary battery that is cyclically rechargeable and dischargeable. Generally, there are a plurality of secondary batteries in the device arranged in groups. Referring to FIG. 1, in some embodiments, the device may be a ship, a vehicle, or the like. The vehicle is an new energy vehicle, and may be a battery electric vehicle, or a hybrid electric vehicle, or a range-extended electric vehicle. A drive motor is disposed in a chassis of the vehicle. The drive motor is electrically connected to a secondary battery. The secondary battery provides electrical energy to the drive motor. The drive motor is connected to wheels on the chassis of the vehicle through a transmission mechanism to drive the vehicle to move. In some embodiments, the secondary battery is a lithium-ion battery.

Figure 2:
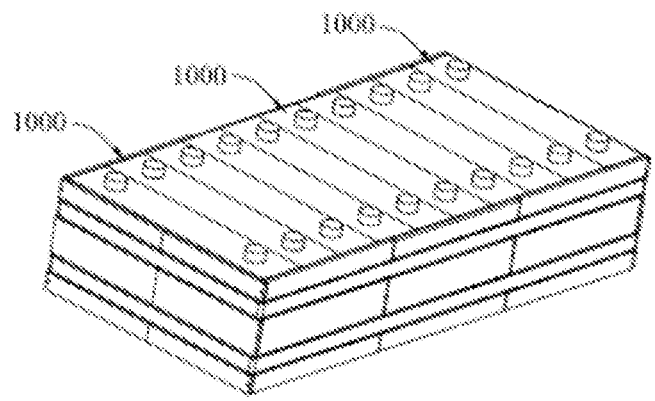
FIG. 2 is a schematic diagram of a battery module according to some embodiments of this application.

An embodiment of this application further provides a battery module. In some embodiments, referring to FIG. 2, the battery module includes a plurality of secondary batteries 1000. The plurality of secondary batteries 1000 are arranged in sequence. In some embodiments, the battery module further includes a prop frame and a plurality of busbars. The prop frame accommodates and fixes the plurality of secondary batteries 1000. The plurality of busbars electrically connect the plurality of secondary batteries 1000 in series, in parallel, or in both series and parallel.

Figure 3:
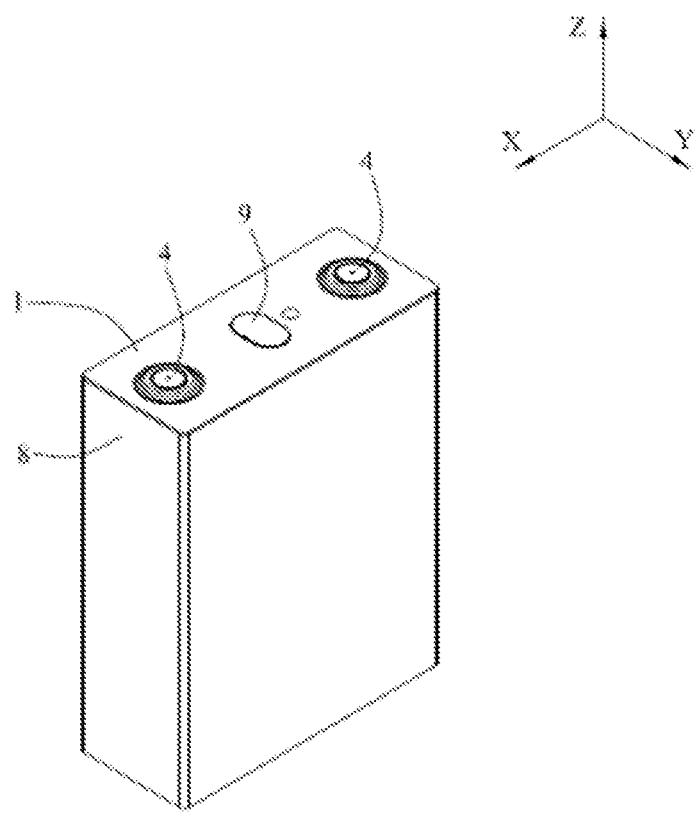
FIG. 3 is a schematic diagram of a secondary battery to some embodiments of this application.
Figure 4:
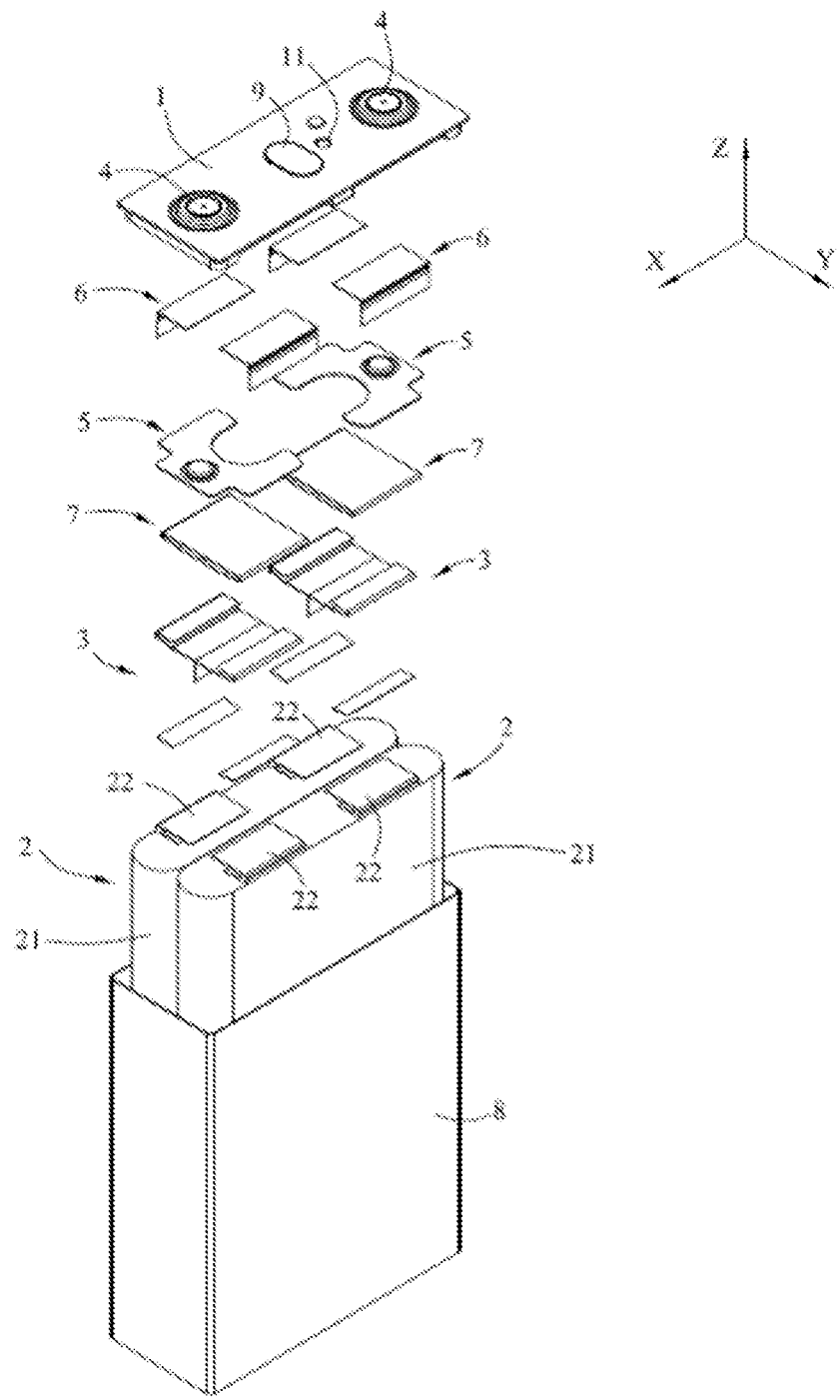
FIG. 4 is an exploded view of the secondary battery shown in FIG. 3.

An embodiment of this application further provides a secondary battery that is cyclically rechargeable and dischargeable. Referring to FIG. 3 and FIG. 4, a secondary battery according to some embodiments includes a cap plate 1, an electrode assembly 2, electrode terminals 4, and a housing 8.

Figure 6:
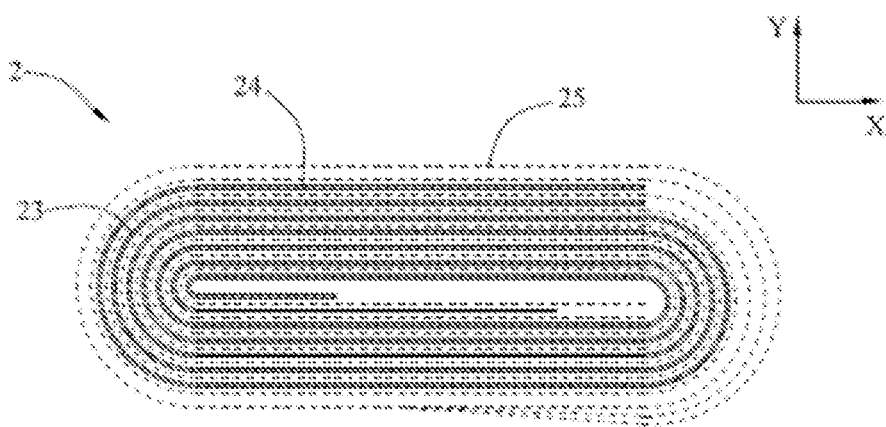
FIG. 6 is a sectional view of the electrode assembly shown in FIG. 5.
Figure 7:
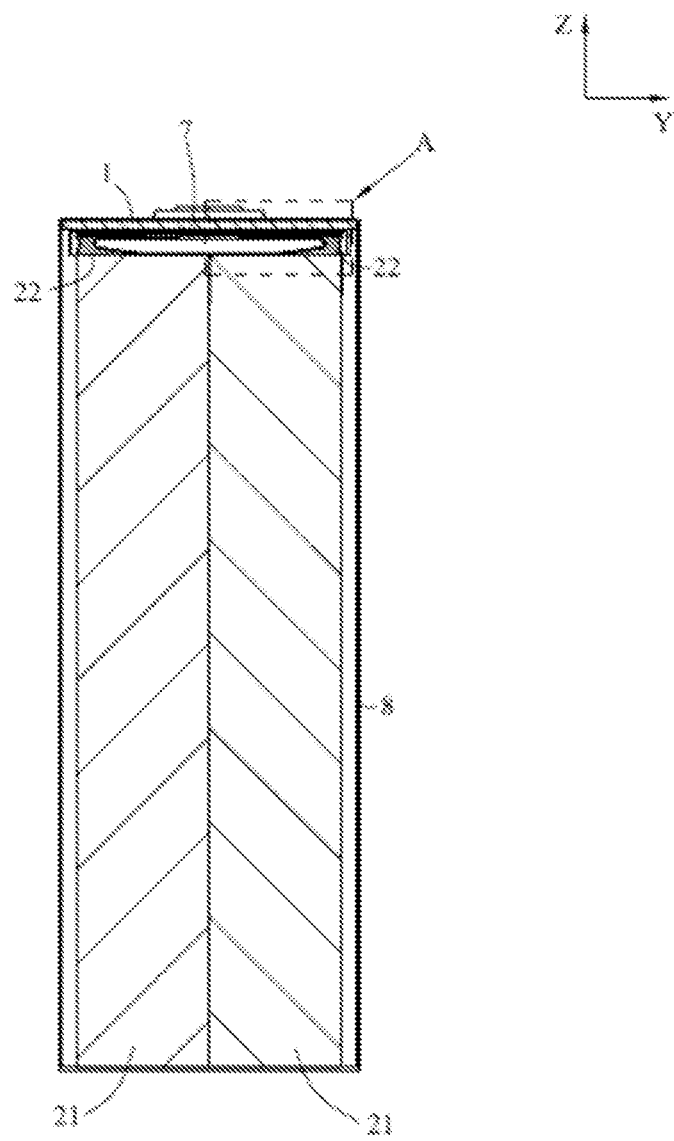
FIG. 7 is a sectional view of the secondary battery shown in FIG. 3.

The electrode assembly 2 is a core member for the secondary battery to implement functions of charging and discharging. Referring to FIG. 6, the electrode assembly 2 includes a first electrode plate 23, a second electrode plate 24, and a separator 25. The separator 25 separates the first electrode plate 23 from the second electrode plate 24.

In some embodiments, the electrode assembly 2 may be a jelly-roll structure. Specifically, referring to FIG. 6, there are one first electrode plate 23 and one second electrode plate 24, and the first electrode plate 23 and the second electrode plate 24 are strap-shaped structures. The first electrode plate 23, the separator 25, and the second electrode plate 24 are sequentially stacked and wound for at least two coils to form the electrode assembly 2. The electrode assembly 2 is flat.

In some alternative embodiments, the electrode assembly 2 may be a stacked structure. Specifically, a plurality of first electrode plates 23 are disposed, and a plurality of second electrode plates 24 are disposed. The plurality of first electrode plates 23 and the plurality of second electrode plates 24 are alternately stacked. The separator 25 separates the first electrode plate 23 from the second electrode plate 24.

The first electrode plate 23 includes a first current collector and a first active material layer coated on a surface of the first current collector. The first current collector is a metal foil such as an aluminum foil. The first active material layer includes a ternary material, lithium manganate, or lithium iron phosphate. The first current collector includes a first coating region and a first blank region. A surface of the first coating region is coated with the first active material layer. No surface of the first blank region is coated with the first active material layer. In a jelly-roll electrode assembly 2, there are a plurality of first blank regions of the first electrode plate 23 that are stacked.

The second electrode plate 24 includes a second current collector and a second active material layer coated on a surface of the second current collector. The second current collector is a metal foil such as a copper foil. The second active material layer contains graphite or silicon. The second current collector includes a second coating region and a second blank region. A surface of the second coating region is coated with the second active material layer. No surface of the second blank region is coated with the second active material layer. In a jelly-roll electrode assembly 2, there are a plurality of second blank regions of the second electrode plate 24 that are stacked.

Figure 5:
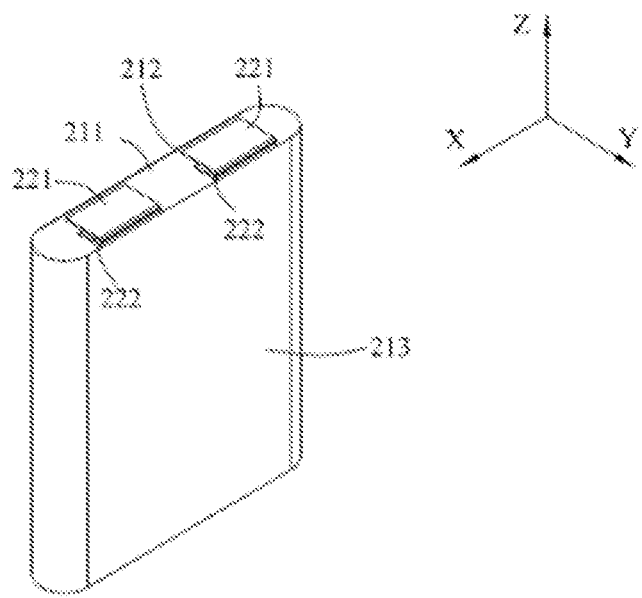
FIG. 5 is a schematic diagram of an electrode assembly according to some embodiments of this application.

Referring to FIG. 5, as seen from the appearance of the electrode assembly 2, the electrode assembly 2 includes a main body 21 and tabs 22 extending from the main body 21. There are two tabs 22. Specifically, the main body 21 includes a first coating region, a first active material layer, a separator 13, a second coating region, and a second active material layer. The two tabs 22 are a first tab and a second tab. The first tab includes the plurality of first blank regions that are stacked, and the second tab includes the plurality of second blank regions that are stacked.

In a secondary battery according to some embodiments, there are a plurality of electrode assemblies 2. The plurality of electrode assemblies 2 are stacked in a thickness direction Y of the secondary battery. In some alternative embodiments, there may be one electrode assembly 2.

Referring to FIG. 3 and FIG. 4, the housing 8 is in a hexahedral shape or other shape. The housing 8 forms an accommodation cavity interiorly to accommodate the electrode assembly 2 and an electrolytic solution. An opening is formed at one end of the housing 8 along a height direction Z. The electrode assembly 2 can be placed into the accommodation cavity of the housing 8 through the opening. The housing 8 may be made of a conductive metal material. In some embodiments, the housing 8 is made of aluminum or an aluminum alloy.

The cap plate 1 is connected to the housing 8 and covers the opening of the housing 8. The electrode terminals 4 are disposed on the cap plate 1. In some embodiments, the electrode terminals 4 are mounted to the cap plate 1 by using a fastener. The electrode terminals 4 protrude above the cap plate 1 for ease of connecting to the busbar.

There are two electrode terminals 4. The two electrode terminals 4 are electrically connected to the first tab and the second tab respectively.

Two electrode lead-out holes are disposed in the cap plate 1. The two electrode lead-out holes run through the cap plate 1 along a thickness direction of the cap plate 1. The two electrode terminals 4 cover the two electrode lead-out holes respectively. By disposing the electrode lead-out holes, it is convenient to implement the electrical connection between the tabs and the electrode terminals.

Figure 16:
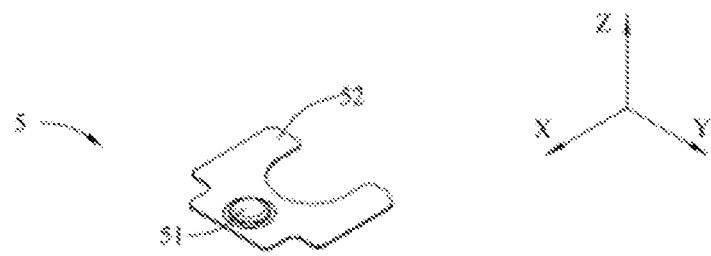
FIG. 16 is a schematic diagram of a current collection member according to some embodiments of this application.

In some embodiments, the secondary battery further includes current collection members 5. Each of the current collection members 5 is configured to connect the electrode terminal 4 and the tab 22. Referring to FIG. 4 and FIG. 16, the current collection member 5 includes a first current collection portion 51 and a second current collection portion 52. The first current collection portion 51 is connected to the electrode terminal 4, and the second current collection portion 52 is connected to the tab 22. The second collection portion 52 is in a flat plate shape. The first current collection portion 51 protrudes beyond the second collection portion 52 toward the cap plate 1. The first current collection portion 51 extends into the electrode lead-out hole and is welded to the electrode terminal 4.

In a process of using the secondary battery, if the secondary battery is abused such as nail-penetrated, the electrode assembly 2 will be short-circuited and generate a large amount of gas. The gas accumulates in the housing 8 and is prone to cause an explosion. Therefore, to improve safety performance of the secondary battery, a secondary battery according to some embodiments further includes a rupture disk 9.

A via hole is disposed on the cap plate 1. The rupture disk 9 is disposed on the cap plate 1 and seals the via hole. The rupture disk 9 can cover the via hole and separate internal space of the secondary battery from the outside, so as to prevent an electrolytic solution in the housing 8 from leaking through the via hole.

When the electrode assembly 2 is short-circuited, gas is released. As the gas increases, gas pressure inside the secondary battery increases gradually. The rupture disk 9 deforms under the action of the air pressure. When the air pressure inside the secondary battery reaches a given value, the rupture disk 9 breaks off at a fragile region. High-pressure gas bursts open the rupture disk 9 and is expelled out of the secondary battery, thereby achieving the purpose of pressure relief and reducing the risk of explosion.

An injection hole 11 is disposed on the cap plate 1. In a process of forming a battery, an electrolytic solution is injected into the housing 8 through the injection hole 11. After the injection process is completed, a sealing strip is welded onto the cap plate 1 to seal the injection hole 11.

Figure 8:
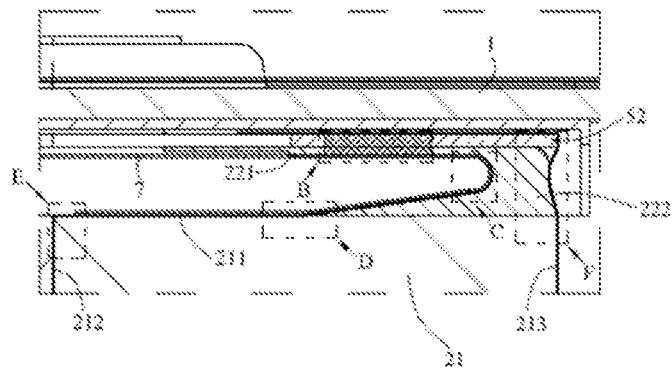
FIG. 8 is a local detailed view of a part indicated by a box A shown in FIG. 7.

In this embodiment of this application, the tab 22 is bent to make the tab 22 occupy a smaller space. Referring to FIG. 5 and FIG. 8, in some embodiments, the bent tab (22) includes a connection portion 221 and a bend portion 222. The connection portion 221 is electrically connected to an electrode terminal 4. The bend portion 222 is bent against the connection portion 221 and is connected between the connection portion 221 and the main body 21. The connection portion 221 is approximately parallel to a thickness direction of the main body 21. The connection portion 221 and the bend portion 222 each include a plurality of metal foil layers.

The connection portion 221 may be directly connected to the electrode terminal 4 or may be connected to the electrode terminal 4 by the current collection member 5. For ease of understanding the secondary battery according to this embodiment of this application, the following describes the secondary battery with reference to some embodiments in which a connection portion 221 is connected to a current collection member 5.

When the tab 22 is bent, stress concentration occurs at a joint between the tab 22 and the current collection member 5. Because the tab 22 includes a plurality of metal foil layers, the tab 22 is prone to rupture at the joint between the tab 22 and the current collection member 5 to impair a current-carrying capacity of the tab 22. In severe circumstances, an innermost metal foil layer of the connection portion 221 (that is, a metal foil layer closest to the main body 21) may break off thoroughly. The broken metal foil layer cannot be fixed, and is prone to be inserted into the main body 21, thereby causing a short-circuit risk.

The secondary battery according to some embodiments further includes a first insulation member 3. The first insulation member 3 is disposed at a side of the connection portion 221 away from the cap plate 1. The first insulation member 3 includes a first insulator 31 connected to the connection portion 221. The connection portion 221 is configured to connect to the current collection member 5. Therefore, when the tab 22 is bent, the connection portion 221 is at high risk of rupturing. The first insulator 31 can fix the connection portion 221, disperse a stress transmitted to the connection portion 221, and reduce the risk of rupturing the connection portion 221. In some embodiments, even if the innermost metal foil layer of the connection portion 221 is thoroughly broken off, the first insulator 31 can still connect the broken metal foils together to avoid inserting into the main body 21, thereby reducing the short-circuit risk.

The first insulation member 3 further includes a second insulator 32 connected to the main body 21. The second insulator 32 is disposed between the connection portion 221 and the main body 21. In some embodiments, the second insulator 32 is connected to a first surface 211 of the main body 21, the first surface being oriented toward the cap plate 1.

Referring to FIG. 5 and FIG. 6, in order to sufficiently separate the first active material layer from the second active material layer, both ends of the separator 25 extend beyond the first active material layer and the second active material layer along a height direction Z. After the separator 25 is wound into shape, an end that is of the separator 25 and that is close to the cap plate 1 approximately forms a surface. The surface is the first surface 211 of the main body 21. Because the first surface 211 is formed by the end of the separator 25, some gaps exist on the first surface 211.

The tab 22 is formed by stacking a plurality of blank regions, and the plurality of blank regions are usually of the same size. When a plurality of blank regions are stacked together, ends that are of the plurality of blank regions and that are away from the main body 21 are jagged and untidy. To ensure high connection strength between the tab 22 and the current collection member 5, the ends that are of the plurality of blank regions and that are away from the main body 21 are usually not directly fixed to the current collection member 5. In other words, the ends that are of the connection portion 221 and that are away from the bend portion 222 are not directly fixed to the current collection member 5.

In order to make the tab 22 occupy a smaller space, the spacing between the connection portion 221 and the main body 21 is relatively small. The end that is of the connection portion 221 and that is away from the bend portion 222 is prone to be bent and inserted into the main body 21 through the gap on the first surface 211, thereby causing a short-circuit risk. In this embodiment of this application, the second insulator 32 can separate the connection portion 221 from the main body 21, so that the end that is of the connection portion 221 and that is away from the bend portion 222 is prevented from being inserted into the main body 21, and the short-circuit risk is reduced.

In some embodiments, in an electrolyte injection process, the electrolytic solution causes an impact onto the first surface 211 of the main body 21. The first surface 211 is formed by the end that is of the separator 25 and that is close to the cap plate 1. Therefore, when the separator 25 is impacted by the electrolytic solution, the separator 25 may bend inward, so that the separator 25 is unable to sufficiently separate the first electrode plate 23 from the second electrode plate 24, thereby causing a short-circuit risk. When impacted by the electrolytic solution, the first electrode plate 23 and the second electrode plate 24 may also be wrinkled and deformed, thereby affecting the performance of the electrode assembly 2.

In a secondary battery according to some embodiments, a projection of the injection hole 11 on the first surface 211 is at least partly covered by the second insulator 32. In some embodiments, a projection of the injection hole 11 on the first surface 211 is fully covered by the second insulator 32. The second insulator 32 separates the first surface 211 from the injection hole 11 to prevent the electrolytic solution from directly impacting the first surface 211, and reduce the deformation of the separator 25 and the electrode plate.

The first insulation member 3 further includes a third insulator 33 connected between the first insulator 31 and the second insulator 32. The third insulator 33 connects the first insulator 31 and the second insulator 32 together to improve the connection strength between the first insulator 31 and the second insulator 32 on the electrode assembly 2, and reduce the peel-off risk. In some embodiments, if the first insulator 31 and the second insulator 32 are disposed discretely, the first insulator 31 and the second insulator 32 need to be connected to the electrode assembly 2 through two processes respectively. By disposing the third insulator 33, one process is enough to connect the first insulation member 3 to the electrode assembly 2, thereby improving assembling efficiency.

At least a part of the bend portion 222 is not fixed to the first insulation member 3. In other words, at least a part of the surface that is of the bend portion 222 and that is oriented toward the first insulation member 3 is not fixed to the first insulation member 3. Further, at least a part of the surface that is of the bend portion 222 and that is oriented toward the first insulation member 3 is covered by the third insulator 33 and not fixed to the third insulator 33.

If the bend portion 222 is wholly fixed to the first insulation member 3 (for example, fixed to the third insulator 33), then when the tab 22 is bent, the first insulation member 3 will pull the innermost metal foil layer of the bend portion 222, and the innermost metal foil layer of the bend portion 222 is at risk of fracturing. However, in this embodiment of this application, at least a part of the bend portion 222 is not fixed to the first insulation member 3. Therefore, the part that is of the bend portion 222 and that is not fixed to the first insulation member 3 can release the stress during the bending of the tab 22, thereby reducing a tensile force exerted by the first insulation member 3 on the bend portion 222 and reducing the risk of fracturing the bend portion 222.

In a secondary battery according to some embodiments, referring to FIG. 10, FIG. 11, FIG. 14, and FIG. 15, the third insulator 33 includes a first part 331 and a second part 332. The first part 331 is connected between the first insulator 31 and the second part 332. The first part 331 is fixed to the bend portion 222, and the second part 332 covers a part of the bend portion 222 and is not fixed to the bend portion 222. The first part 331 is closer to the joint between the connection portion 221 and the current collection member 5 than the second part 332. Therefore, in some embodiments, the first part 331 is connected to the bend portion 222, so as to reduce the risk of fracturing the connection portion 221. In some embodiments, even if the innermost metal foil layer of the connection portion 221 is completely broken off, the first insulator 31 and the first part 331 can connect the broken metal foils together, thereby avoiding being inserted into the main body 21.

In some embodiments, at least a part of the first part 331 is arc-shaped. The tab 22 may be bent along the first part 331.

Figure 14:
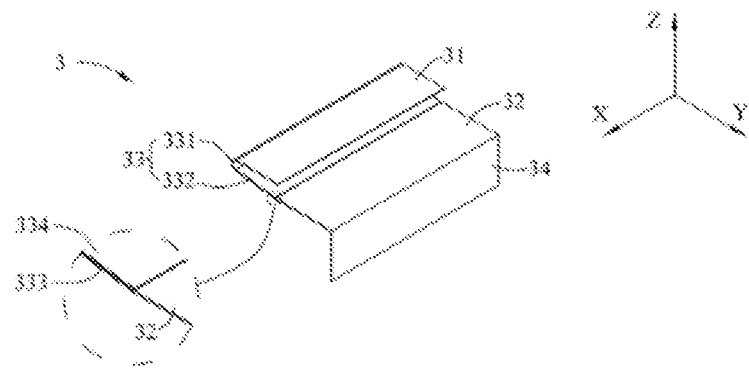
FIG. 14 is a schematic diagram of a first insulation member according to some embodiments of this application.
Figure 15:
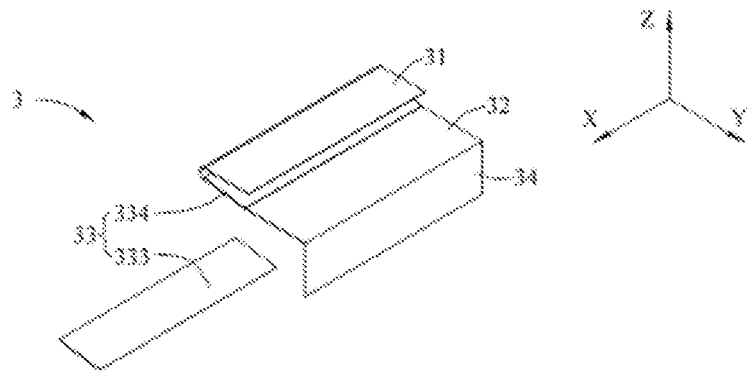
FIG. 15 is an exploded view of the first insulation member shown in FIG. 14.

In a secondary battery according to some embodiments, referring to FIG. 14 and FIG. 15, the third insulator 33 includes an inner piece 333 and an outer piece 334 fixed to the inner piece 333. The inner piece 333 is disposed between the outer piece 334 and bend portion 222. The inner piece 333 is not fixed to the bend portion 222. Both the inner piece 333 and the outer piece 334 are single-sided adhesive tape. The inner piece 333 and the outer piece 334 are directly bonded together. A surface that is of the inner piece 333 and that is away from the outer piece 334 is smooth and non-adhesive, so that the inner piece 333 is not fixed to the bend portion 222.

In a secondary battery according to some embodiments, referring to FIG. 14 and FIG. 15, the size of the outer piece 334 is larger than the size of the inner piece 333. In other words, the inner piece 333 covers just a part of the outer piece 334. A part that is of the outer piece 334 and that extends beyond the inner piece 333 is directly bonded onto the bend portion 222. Specifically, a part that is of the outer piece 334 and that overlaps the inner piece 333 combines with the inner piece 333 to form the second part 332 that is not fixed to the bend portion 222. The part that is of the outer piece 334 and that extends beyond the inner piece 333 forms the first part 331 that is fixed to the bend portion 222.

In a secondary battery according to some embodiments, the third insulator 33 may be not fixed to the bend portion 222 at all. In this case, the size of the outer piece 334 is equal to the size of the inner piece 333, and the outer piece 334 sufficiently overlaps the inner piece 333.

In a secondary battery according to some embodiments, the first insulator 31 is bonded to the connection portion 221, and the second insulator 32 is bonded to the main body 21. Both the first insulator 31 and the second insulator 32 are single-sided adhesive tape.

In a secondary battery according to some embodiments, the first insulator 31, the outer piece 334, and the second insulator 32 are integrated into a whole. The first insulator 31, the outer piece 334, and the second insulator 32 are different parts of one piece of single-sided adhesive tape. The inner piece 333 is another piece of single-sided adhesive tape of a smaller size. In this embodiment of this application, two pieces of single-sided adhesive tape of different sizes are bonded together to form a first insulation member 3 that is adhesive in a specific region.

In a secondary battery according to some embodiments, referring to FIG. 8, the second insulator 32 extends beyond the connection portion 221 along a direction in which the bend portion 222 points to the third insulator 33. In this case, on the first surface 211, a projection of the end that is of the connection portion 221 and that is away from the bend portion 222 at least partly overlaps a projection of the second insulator 32. The second insulator 32 can separate the connection portion 221 from the main body 21, so that the end that is of the connection portion 221 and that is away from the bend portion 222 is prevented from being inserted into the main body 21, and the short-circuit risk is reduced.

Figure 12:
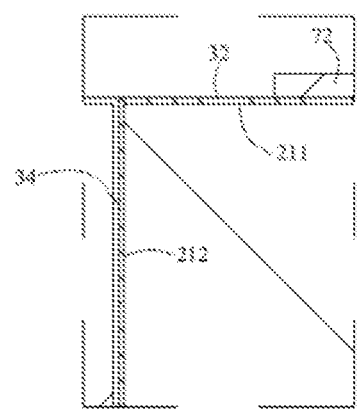
FIG. 12 is a local detailed view of a part indicated by a box E shown in FIG. 8.

In a secondary battery according to some embodiments, referring to FIG. 12, the first insulation member 3 further includes a fourth insulator 34. The fourth insulator 34 is connected to an end of the second insulator 32, the end being away from the third insulator 33. In a thickness direction of the main body 21, the fourth insulator 34 is connected to the outside of the main body 21. The main body 21 contains a second surface 212 and a third surface 213. The second surface 212 and the third surface 213 are disposed opposite to each other along the thickness direction of the main body 21. The second surface 212 is located at a side that is of the bend portion 222 and that is close to the third insulator 33. The third surface 213 is located at a side of the bend portion 222, the side being away from the third insulator 33. In some embodiments, the fourth insulator 34 is bonded to the second surface 212. The fourth insulator 34 and the third insulator 33 are integrated into a whole.

The fourth insulator 34 disposed can increase the connection strength between the entire first insulation member 3 and the electrode assembly 2, and reduce the risk of peeling off the first insulation member 3 from the electrode assembly 2 under the immersion of the electrolytic solution.

Figure 9:
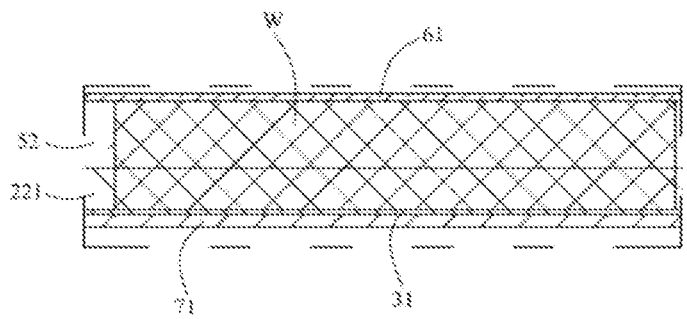
FIG. 9 is a local detailed view of a part indicated by a box B shown in FIG. 8.

In a secondary battery according to some embodiments, referring to FIG. 8 and FIG. 9, the current collection member 5 is welded to the connection portion 221 to form a weld region W. A plurality of metal foil layers of the connection portion 221 are connected to the current collection member 5 by welding. At an edge of the weld region W, each metal foil layer is of relatively low strength, and is at risk of fracturing when being under a force. In this embodiment of this application, the first insulator 31 covers the weld region W from a side of the weld region W, the side being oriented toward the main body 21. The region of the current collection member 5, to which the connection portion 221 is welded, can be connected with an unwelded region by the first insulator 31, so as to reduce the risk of fracturing the connection portion 221 in a process of bending the tab 22.

In some embodiments, after the weld region W is formed, some metal particles may remain on the surface of the weld region W. The metal particles falling into the main body 21 may cause a short-circuit risk. The first insulator 31 can fix the metal particles onto the weld region W to prevent the metal particles from falling, and reduce the short-circuit risk.

The connection portion 221 is located at a side of the second current collection portion 52 away from the cap plate 1. The connection portion 221 is welded to the second current collection portion 52 to form the weld region W.

Figure 13:
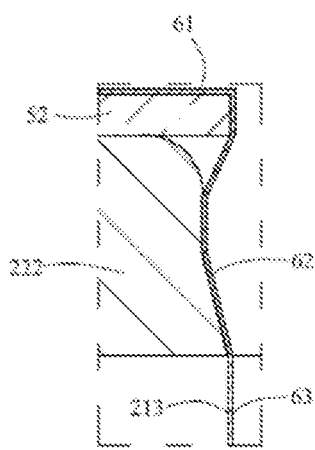
FIG. 13 is a local detailed view of a part indicated by a box F shown in FIG. 8.

In a secondary battery according to some embodiments, referring to FIG. 8 and FIG. 13, the secondary battery further includes a second insulation member 6. The second insulation member 6 covers the weld region W from a side of the weld region W, the side being oriented toward the cap plate 1. The second insulation member 6 is bonded to a surface that is of the weld region W and that is oriented toward the cap plate 1, so as to fix the metal particles on the surface of the weld region W.

The second insulation member 6 includes a first overlayer 61 and a second overlayer 62. The first overlayer 61 covers the weld region W from a side of the weld region W, the side being oriented toward the cap plate 1. The second overlayer 62 is connected to the first overlayer 61 and is bent against the first overlayer 61. The first overlayer 61 is bonded to a surface of the welding region W, the surface being oriented toward the cap plate 1. The second overlayer 62 is located at a side of the bend portion 222 away from the third insulator 33, and is connected to the bend portion 222.

In a process of placing the electrode assembly 2 into the housing 8, there is a risk that an edge of the housing 8 contacts the bend portion 222 due to process errors. With the second overlayer 62 disposed, the bend portion 222 can be separated from the housing 8, thereby preventing the bend portion 222 from being scratched by the housing 8, and ensuring the current-carrying capacity of the bend portion 222.

The second insulation member 6 further includes a third overlayer 63. The third overlayer 63 extends from an end that is of the second overlayer 62 and that is away from the first overlayer 61. The third overlayer 63 is connected to the main body 21. In some embodiments, the third overlayer 63 is bonded to a third surface 213 of the main body 21.

The third overlayer 63 disposed can increase the connection strength between the entire second insulation member 6 and the electrode assembly 2, and reduce the risk of peeling off the second insulation member 6 from the electrode assembly 2 under the immersion of the electrolytic solution. In some embodiments, the third overlayer 63 can reduce the risks such as scratch of the main body 21 by the housing 8.

Figure 17:
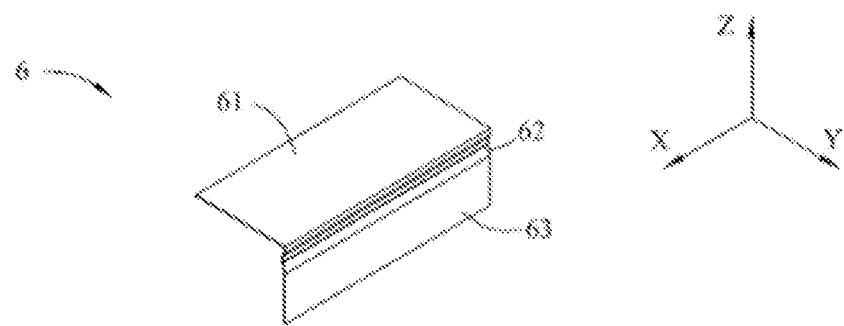
FIG. 17 is a schematic diagram of a second insulation member according to some embodiments of this application.

In some embodiments, referring to FIG. 17, the second insulation member 6 is single-sided adhesive tape. The first overlayer 61, the second overlayer 62, and the third overlayer 63 are integrated into a whole.

Figure 18:
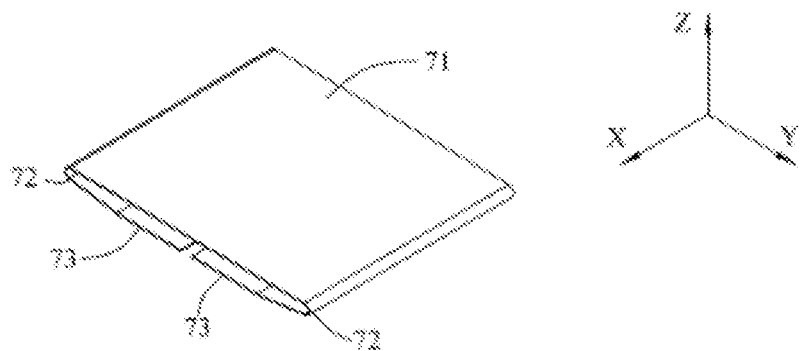
FIG. 18 is a schematic diagram of a prop member according to some embodiments of this application.
Figure 19:
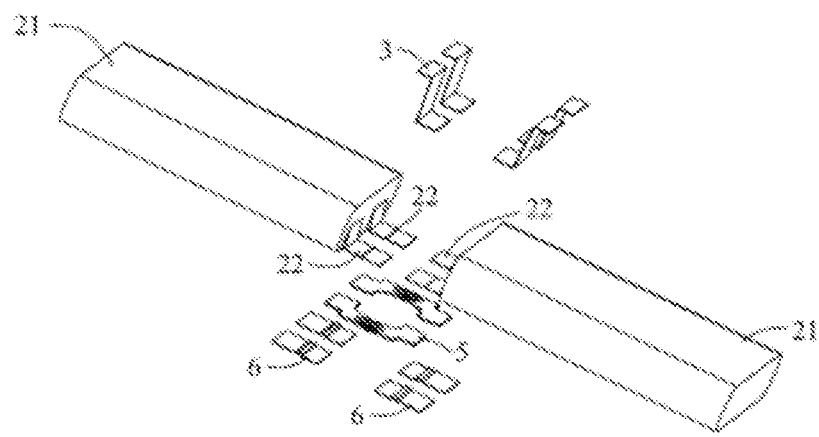
FIG. 19 is a schematic diagram of a secondary battery in an assembling process according to some embodiments of this application.

In a secondary battery according to some embodiments, referring to FIG. 4, FIG. 8, and FIG. 18, the secondary battery further includes a prop member 7. The prop member 7 includes a first prop board 71, a second prop board 72, and a third prop board 73. The first prop board 71 is disposed at a side of the first insulator 31 away from the cap plate 1. The second prop board 72 is located between the first prop board 71 and the second insulator 32. The third prop board 73 is connected between the first prop board 71 and the second prop board 72. The prop member 7 is formed by bending a sheet material. Under the action of an inherent elastic force, the first prop board 71 can prop the connection portion 221 from a lower side. In this way, the end that is of the connection portion 221 and that is away from the bend portion 222 is prevented from being bent downward and inserted into the main body 21. The material of the prop member 7 is PET.

Figure 10:
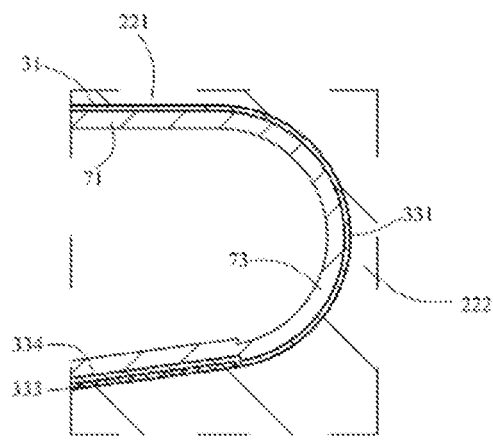
FIG. 10 is a local detailed view of a part indicated by a box C shown in FIG. 8.
Figure 11:
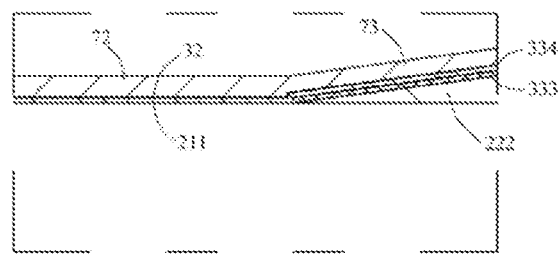
FIG. 11 is a local detailed view of a part indicated by a box D shown in FIG. 8.

In some embodiments, the prop member 7 is bonded to the first insulation member 3. Referring to FIG. 10 and FIG. 11, the third prop board 73 fits snugly with and is bonded to the third insulator 33. When the tab 22 is bent, the third prop board 73 can support shaping of the bend portion 222 of the tab 22, thereby reducing the risk of inserting the bend portion 222 into the main body 21.

Under the action of an inherent elastic force of the prop member 7, the end that is of the second prop board 72 and that is away from the third prop board 73 exerts a force on the first surface 211. That is, the end of the third prop board 73 is prone to be inserted into the main body 21 to cause a short-circuit risk. In this embodiment of this application, referring to FIG. 12, along a direction in which the bend portion 222 points to the third insulator 33, the second insulator 32 extends beyond the second prop board 72. The second insulator 32 can separate the second prop board 72 from the main body 21, thereby preventing the end of the third prop board 73 from being inserted into the main body 21.

Although this application has been described with reference to optional embodiments, various improvements may be made to the embodiments without departing from the scope of this application, and the components therein may be replaced with equivalents. Particularly, to the extent that no structural conflict exists, various technical features mentioned in various embodiments can be combined in any manner. This application is not limited to the specific embodiments disclosed herein, but includes all technical solutions falling within the scope of the claims.

What is claimed is:

1. A secondary battery, comprising:
a cap plate and a housing:
electrode terminals, disposed on the cap plate; and
an electrode assembly accommodated in the housing, the electrode assembly comprising a main body and a plurality of tabs extending from the main body,
wherein each tab comprises a connection portion and a bend portion, the connection portion is electrically connected to one of the electrode terminals, and the bend portion is bent against the connection portion and is connected between the connection portion and the main body;
wherein a first insulation member is disposed at a side of each tab that is of the connection portion and that is away from the cap plate, the first insulation member comprises a first insulator, a second insulator, and a third insulator;
the first insulator is connected to the connection portion, the second insulator is connected to the main body, and the third insulator is connected between the first insulator and the second insulator;
wherein at least a part of the bend portion is covered by the third insulator and not fixed to the third insulator;
wherein the third insulator comprises a first part and a second part, and the first part is connected between the first insulator and the second part; and
the first part is fixed to the bend portion, and the second part covers a part of the bend portion and is not fixed to the bend portion.

2. The secondary battery according to claim 1, wherein the third insulator comprises an inner piece and an outer piece fixed to the inner piece, the inner piece is disposed between the outer piece and the bend portion, and the inner piece is not fixed to the bend portion.

3. The secondary battery according to claim 2, wherein the first insulator is bonded to the connection portion, the outer piece is bonded to the inner piece, and the second insulator is bonded to the main body.

4. The secondary battery according to claim 1, wherein along a direction in which the bend portion points to the third insulator, the second insulator extends beyond the connection portion.

5. The secondary battery according to claim 4, wherein the first insulation member further comprises a fourth insulator, and the fourth insulator is connected to an end of the second insulator, the end being away from the third insulator; and in a thickness direction of the main body, the fourth insulator is connected to the outside of the main body.

6. The secondary battery according to claim 1, wherein the secondary battery further comprises current collection members, and each of the current collection members is configured to connect the electrode terminal and the tab; and the current collection member is welded to the connection portion to form a weld region, and the first insulator covers the weld region from a side of the weld region, the side being oriented toward the main body.

7. The secondary battery according to claim 6, wherein the secondary battery further comprises a second insulation member, and the second insulation member covers the weld region from a side of the weld region, the side being oriented toward the cap plate.

8. The secondary battery according to claim 7, wherein the second insulation member comprises a first overlayer and a second overlayer, the first overlayer covers the weld region from a side of the weld region, the side being oriented toward the cap plate; and the second overlayer is connected to the first overlayer and is bent against the first overlayer; and the second overlayer is located at a side of the bend portion away from the third insulator, and is connected to the bend portion.

9. The secondary battery according to claim 8, wherein the second insulation member further comprises a third overlayer, the third overlayer extends from an end that is of the second overlayer and that is away from the first overlayer, and the third overlayer is connected to the main body.

10. The secondary battery according to claim 1, wherein the secondary battery further comprises a prop member, the prop member comprises a first prop board, a second prop board, and a third prop board, the first prop board is disposed at a side of the first insulator away from the cap plate, the second prop board is located between the first prop board and the second insulator, and the third prop board is connected between the first prop board and the second prop board; and along a direction in which the bend portion points to the third insulator, the second insulator extends beyond the second prop board.

11. A battery module, comprising a plurality of secondary batteries, wherein each secondary battery comprises:
a cap plate and a housing;
electrode terminals, disposed on the cap plate; and
an electrode assembly accommodated in the housing, the electrode assembly comprising a main body and a plurality of tabs extending from the main body,
wherein each tab comprises a connection portion and a bend portion, the connection portion is electrically connected to one of the electrode terminals, and the bend portion is bent against the connection portion and is connected between the connection portion and the main body;
wherein a first insulation member is disposed at a side of each tab that is of the connection portion and that is away from the cap plate, the first insulation member comprises a first insulator, a second insulator, and a third insulator;
the first insulator is connected to the connection portion, the second insulator is connected to the main body, and the third insulator connected between the first insulator and the second insulator;
wherein at least a part of the bend portion is covered by the third insulator and not fixed to the third insulator;
wherein the third insulator comprises a first part and a second part, and the first part is connected between the first insulator and the second part; and
the first part is fixed to the bend portion, and the second part covers a part of the bend portion and is not fixed to the bend portion.

12. A device using a battery as a power supply, wherein the battery is a secondary battery, and the secondary battery comprises:
a cap plate and a housing;
electrode terminals, disposed on the cap plate; and
an electrode assembly accommodated in the housing, the electrode assembly comprising a main body and a plurality of tabs extending from the main body,
wherein each tab comprises a connection portion and a bend portion, the connection portion is electrically connected to one of the electrode terminals, and the bend portion is bent against the connection portion and is connected between the connection portion and the main body;
wherein a first insulation member is disposed at a side of each tab that is of the connection portion and that is away from the cap plate, the first insulation member comprises a first insulator, a second insulator, and a third insulator;
the first insulator is connected to the connection portion, the second insulator is connected to the main body, and the third insulator is connected between the first insulator and the second insulator;
wherein at least a part of the bend portion is covered by the third insulator and not fixed to the third insulator;
wherein the third insulator comprises a first part and a second part, and the first part is connected between the first insulator and the second part; and
the first part is fixed to the bend portion, and the second part covers a part of the bend portion and is not fixed to the bend portion.

* * * * *